United States Patent Office 3,108,975
Patented Oct. 29, 1963

3,108,975
PROCESS FOR PREPARING FOAMED POLY-
URETHANE MATERIALS
Arthur Lambert and James Harry Wild, Manchester,
England, assignors to Imperial Chemical Industries
Limited, London, England, a corporation of Great
Britain
No Drawing. Filed Mar. 24, 1960, Ser. No. 17,255
Claims priority, application Great Britain Mar. 31, 1959
9 Claims. (Cl. 260—2.5)

This invention relates to improvements in or relating to the manufacture of polymeric materials, more particularly foamed polymeric materials from hydroxyl-ended polymers and organic polyisocyanates.

It has already been proposed to prepare polymeric materials by the interaction of organic polyisocyanates with hydroxyl-containing materials for example polyesters, polyesteramides and polyethers, and to modify the reaction for example by the addition of water in order to produce blown, cellular polyurethane materials.

In manufacturing foamed polyurethane materials in this way, one available method consists of reacting the hydroxyl-containing material in a single-type process with the organic polyisocyanate and water, if necessary in the presence of catalysts, surface active agents or other auxiliary agents, whereby simultaneous interaction between the isocyanate, water and hydroxyl-containing material occur to give a foamed product. Alternatively, the hydroxyl-containing material may be reacted with sufficient polyisocyanate to give an intermediate reaction product containing isocyanate groups, and this product may then be reacted with water, if desired in the presence of catalysts, surface active agents or other auxiliary agents, in order to produce the final foamed product.

Although the single-stage process is more desirable on both technical and economic grounds, it has hitherto been found that the production of satisfactory foamed products by this method is difficult or impossible in some instances, particularly when the hydroxyl-containing material used are polyethers, for example polypropylene glycol. These difficulties may result from the lower reactivity towards polyisocyanates of the secondary hydroxyl end groups present in such polyethers, in contrast to the higher reactivity of the primary hydroxyl groups commonly present in the polyesters used in making flexible foams. The addition to the reaction mixture of tertiary amines, for example dimethylcyclohexylamine and dimethylbenzylamine, which are widely employed in the art as catalysts in the manufacture of foamed polyurethane products, fails to accelerate the reaction of the polyethers containing many secondary hydroxyl end groups to an extent sufficient to make possible the production of satisfactory foams.

We have now found that it is possible to carry out this simultaneous interaction of hydroxyl-ended polymer, polyisocyanate and water very readily, and to produce a satisfactory foam when there is present as catalyst certain strong bases or certain salts of a strong base and a weak acid which act as a source of hydroxide ions, that is salts which yield alkaline aqueous solutions. These catalysts are remarkably effective and by their use foams of excellent physical properties are conveniently and economically made. Similar results cannot be secured by the use, even in large amounts, of the tertiary amines such as dimethyl cyclohexylamine and dimethylbenzylamine, which are commonly used as catalysts in the prior art processes.

Thus according to the invention we provide an improved process for the manufacture of polyurethane materials by the interaction of an organic polyisocyanate and a hydroxyl group-containing polymer, characterised in that the interaction is carried out in the presence as catalyst of a basic compound comprising the hydroxide or weak acid salt of an alkali metal, alkaline earth metal or of a fully substituted quaternary ammonium, phosphonium or ternary sulphonium radical.

Examples of basic compounds suitable for use in the process of the present invention include hydroxides of alkali metals, for example lithium, sodium and potassium, alkaline earth metals, for example calcium, strontium and barium, fully substituted quaternary ammonium, phosphonium or ternary sulphonium radicals, preferably those bearing alkyl, cycloalkyl and aralkyl groups, for example N-methylpyridinium, benzyltrimethylammonium and trimethylcyclohexylammonium radicals. Other examples of catalysts include salts of the aforesaid metals and radicals with acidic materials having an acid strength less than that of hydrochloric acid, for example alkoxides, such as methoxides, ethoxides, propoxides and butoxides; phenoxides and substituted phenoxides having non-isocyanate-reactive substituents, for example alkyl groups such as methyl, ethyl, tert-butyl and dodecyl, and halogeno-substituents such as chloro and bromo, and nitro groups; mercaptides, pyridolates such as salts of 3- and 4-hydroxypyridines and their derivatives bearing non-isocyanate-reactive substituents; salts of carboxylic acids having no isocyanate-reactive groups other than carboxyl groups, for example acetic acid, octoic acid, oxalic acid, sebacic acid, phthalic acid and naphthoic acid; hypochlorites, carbonates, azides and thiocyanates.

Preferred compounds are sodium and potassium hydroxides and weak acid salts of sodium and potassium.

Particularly preferred catalysts for use in the present process are hydroxides, alkoxides and phenoxides.

Sodium and potassium alkoxides may be added to the reaction mixture as such or may be conveniently produced in situ by the addition of sodium or potassium metal to the hydroxyl group-containing polymer, for example polypropylene glycol.

Hydroxides and weak acid salts of the quaternary ammonium, phosphonium and ternary sulphonium radicals may also be prepared in situ by using a mixture of a salt of said radicals, for example a halide, and a basic hydroxide or weak acid salt of an alkali metal, for example sodium hydroxide or potassium acetate.

The proportions of the catalysts employed in this invention may be between 0.01% and 5%, and preferably between 0.25% and 2.5%, by weight of the hydroxyl-containing polymer. Larger or smaller amounts may be used if desired, but larger proportions may not lead to any additional advantage and smaller proportions may produce an effect inadequate for most technical requirements. The optimum proportions, however, will necessarily depend to a considerable extent upon the particular reaction components and conditions employed.

While the process of our invention may be used for the manufacture of any polyurethane products, whether rigid or flexible, cellular or homogeneous, and in the form for example of coatings, shaped articles and adhesive layers, it is especially advantageous for use in the manufacture of foamed polyurethane products by the simultaneous interaction of hydroxyl-ended polymer, polyisocyanate and water, for the reasons already given.

The starting materials to be used in the process of the present invention may be those more fully described in the prior art as suitable for polyurethane manufacture.

Suitable polyisocyanates include aliphatic diisocyanates, such as hexamethylene diisocyanate, aromatic diisocyanates such as tolylene diisocyanates, diphenylmethane-4:4'-diisocyanate, 3-methyldiphenylmethane-4:4'-diisocyanate, m- and p-phenylene diisocyanates and chlorophenylene-2:4'-diisocyanate and cycloaliphatic diisocyanates such as dicyclohexylmethane diisocyanate. Triisocyanates which may be used include aromatic triisocyanates such as 2:4:6-triisocyanatotoluene and 2:4:4'-triisocyanatodiphenyl ether. Other polyisocyanates which may be used include uretedione and isocyanurate polymers of diisocyanates such as tolylene-2:4-diisocyanate and polyisocyanate compositions comprising major proportions of a diarylmethane diisocyanate and at least 5% by weight of polyisocyanate of functionality greater than two, made for example, by phosgenating the corresponding diamines or the polyamine compositions obtained by condensing formaldehyde with aromatic amines. Mixtures of polyisocyanates may be used, including mixtures obtained by reacting an excess of a diisocyanate with for example a trihydric alcohol such as trimethylolpropane.

The hydroxyl-containing polymer may be for example a polyester, polyether or polyesteramide.

The polyesters or polyesteramides may be made for example from dicarboxylic acids and polyhydric alcohols and, as necessary, diamines or aminoalcohols. Suitable dicarboxylic acids include succinic, glutaric, adipic, suberic, azelaic, and sebacic acids as well as aromatic acids such as phthalic, isophthalic and terephthalic acids. Mixtures of acids may be used. Examples of polyhydric alcohols include glycols such as ethylene glycol, 1:2-propylene glycol, 1:3-butylene glycol, diethylene glycol, trimethylene glycol, tetramethylene glycol, pentamethylene glycol, hexamethylene glycol, decamethylene glycol and 2:2-dimethyltrimethylene glycol. Mixtures of glycols may be used and other polyhydric alcohols, such as trimethylolpropane, pentaerythritol or glycerol, may be included in varying amounts, or used alone according to the desired rigidity of the products. Examples of diamines and aminoalcohols include ethylene diamine, hexamethylene diamine, monoethanolamine, phenylene diamines and benzidine.

As examples of polyethers for use in the process of the present invention there may be mentioned hydroxylended polymers and copolymers of cyclic oxides and especially of ethylene oxide, epichlorhydrin, 1:2-propylene oxide, 1:2-butylene oxide or other alkylene oxides, oxacyclobutane and substituted oxacyclobutanes, and tetrahydrofuran. Such polyethers may be linear polyethers, as are prepared, for example by the polymerisation of an alkylene oxide, in the presence of a glycol initiator. Alternatively there may be used branched polyethers prepared for example by polymerising an alkylene oxide in the presence of a substance having more than two active hydrogen atoms, for example glycerol, pentaerythritol and ethylene diamine. Mixtures of linear and branched polyethers, or mixtures of polyesters and polyethers, may be used if desired.

It is preferred to use a hydroxyl-containing material wherein the hydroxyl groups are predominantly secondary hydroxyl groups, since thereby the most valuable and surprising technical results are obtained, namely the exceptional ease of satisfactory foam-formation in a one stage process.

It is particularly difficult to prepare polyurethane foams by the simultaneous interaction of the hydroxyl group-containing polymer, polyisocyanate and water when the hydroxyl group-containing polymer is a polyether having predominantly secondary hydroxyl end-groups. The process of the present invention is accordingly particularly valuable in the one-stage preparation of foams from such polyethers, of which examples include the polymers of substituted 1:2-alkylene oxides such as propylene oxide or 1:2- or 2:3-butylene oxides. These polyethers may be prepared, for example, by the base-catalysed polymerisation of propylene oxide in the presence of water or a simple glycol to give a polypropylene glycol; alternatively propylene oxide, for example, may be polymerised in the presence of triols such as glycerol or triethanolamine, or of compounds of higher functionality such as sorbitol or ethylene diamine to give polypropylene polyols.

The process of the present invention is also applicable with advantage to hydroxyl-containing materials containing predominantly primary hydroxyl groups, since the compounds specified are much more effective and less volatile than conventional tertiary amines and possess no odour.

The interaction between the polyisocyanate, the hydroxyl-containing material, and any water employed may be carried out in a continuous or discontinuous manner using prior art methods. In the preparation of foams water is normally incorporated in an amount of from 1 to 10% by weight of the hydroxyl group-containing polymer. The interaction may be modified if desired by the incorporation of other ingredients and known adjuvants, including tertiary amine catalysts, of which examples include triethylamine, tri-(n-butyl)amine, N:N:N':N'-tetramethylhexamethylene diamine, N:N-dimethylbenzylamine, N:N-diethylbenzylamine, N:N-dimethylcyclohexylamine, N-methylpiperidine, N-ethylpiperidine, N-methylmorpholine, N-ethylmorpholine, N:N'-dimethylpiperazine, N:N:N':N" - tetramethyl-1:3-butanediamine, β-diethylaminopropionamide, 1:4-diazabicyclo-[2:2:2]-octane (triethylene diamine), pyrrolizidine, 2-diethylaminoethyl acetate, 2-diethylaminoethylcarbamilate, and 2-diethylaminoethylbenzyl ether. The foregoing list of tertiary amines is a list of compounds that are representatives of various classes of tertiary amine suitable for use in the present process.

Other adjuvants include non-basic metal catalysts for example manganous and manganic acetylacetonates and dialkyl tin compounds (for example di-n-butyl tin dilaurate), non-ionic surface active agents, salts of sulphuric acid derivatives of high molecular weight organic compounds, silicone oils, foam-stabilising agents, for example ethyl cellulose, low molecular weight polyhydroxy compounds such as trimethylolpropane, pigments, colouring matters, plasticisers, for example dialkyl phthalates, and fire-proofing agents for example tri-(β-chloroethyl)phosphate or antimony compounds, or mixtures thereof.

The catalysts which are the subject of this invention give particularly valuable results in the production of polyurethane foams by a single stage process from polyethers and polyisocyanates, when a silicone oil surfactant is also incorporated, for example a polyalkylsilane or a polyalkylsilane-polyoxyalkylene block copolymer, usually in the proportion of from 0.01% to 2.0%, by weight of the polyether.

The catalysts of this invention are easily soluble in either the water or the hydroxyl-containing material, and do not possess any malodorous properties.

The invention is illustrated but not limited by the following examples, in which parts and percentages are by weight:

*Example 1*

2.35 parts of a solution prepared from 50 parts of the reaction product of one mole of octyl phenol with 10 moles of ethylene oxide, 34 parts of sulphated methyl oleate and 151 parts of water, are mixed with 0.6 part of sodium hydroxide, and the emulsion thus obtained is added to 50 parts of linear polypropylene glycol of molecular weight 2000. The mixture is stirred for 1 minute, 20 parts of an 80:20 mixture of tolylene-2:4-diisocyanate and tolylene-2:6-diisocyanate are then added and the mixture again vigorously stirred. The foaming and still fluid reaction mixture is poured into a mould and allowed to stand at room temperature. A low density, flexible foam with good physical properties is rapidly obtained.

Repetition of the procedure of the above example, in which the 0.6 part of sodium hydroxide is replaced by an equal weight of dimethylbenzylamine, dimethylcyclohexylamine or N-methylmorpholine fails to yield foamed products.

*Example 2*

The preparation described in Example 1 is repeated, using 0.6 part of sodium phenate in place of the sodium hydroxide. A low density flexible foam with good physical properties is rapidly obtained.

*Example 3*

The preparation described in Example 1 is repeated using 0.6 part of sodium methoxide in place of the sodium hydroxide. A low density flexible foam with good physical properties is rapidly obtained.

*Example 4*

0.35 part of potassium hydroxide is mixed with 2.35 parts of a solution prepared from 50 parts of the reaction product of 1 mole of octyl phenol with 10 moles of ethylene oxide, 34 parts of sulphated methyl oleate and 151 parts of water, and the mixture stirred with a linear polypropylene glycol of molecular weight 2000, for 2 minutes. The mixture thus obtained is allowed to stand for 2 minutes and 20 parts of the 80:20 mixture of tolylene 2:4-diisocyanate and tolylene-2:6-diisocyanate containing 0.055 part of an alkyl-silane-polyoxyalkylene copolymer is added with vigorous stirring. The foaming and still fluid mixture is poured into a mould when a flexible foam with good pore structure and low density is rapidly obtained. The surface of the foam is "tack-free" within 5 minutes.

*Example 5*

The preparation described in Example 5 is carried out, replacing the 0.35 part of potassium hydroxide by 0.4 part of sodium hydroxide, and using an amount of alkyl-silane-polyoxyalkylene co-polymer reduced from 0.055 part to 0.027 part. A flexible foam with good pore structure, low density and excellent resilience is obtained.

*Example 6*

0.8 part of sodium carbonate is mixed with 4.7 parts of a solution prepared from 50 parts of the reaction product of 1 mole of nonyl phenol with 9 moles of ethylene oxide, 34 parts of the sodium salt of sulphated methyl oleate and 151 parts of water, and the mixture stirred with 100 parts of linear polypropylene glycol of approximate molecular weight 2000 for 1 minute. A solution of 1 part of a methyl-phenyl-polysiloxane containing approximately three methyl groups to one phenyl group and having a viscosity of 120 centistokes at 25° C., in 40 parts of an 80:20 mixture of tolylene-2:4- and tolylene-2:6-diisocyanates, is added to the mixture with rapid stirring. When foaming starts the mixture is poured into a mould, when a low density flexible foam is rapidly obtained. The surface was "tack-free" within 5 to 10 minutes.

*Example 7*

The preparation described in Example 6 is repeated but replacing the 0.8 part of sodium carbonate by 0.8 part of calcium acetate and 0.5 part of dimethylbenzylamine. A flexible foamed product is obtained.

*Example 8*

A mixture of 1 part of sodium acetate trihydrate, 1 part of the reaction product of nonyl phenol with 9 moles of ethylene oxide, 0.7 part of the sodium salt of sulphated methyl oleate and 2.7 parts of water, was stirred with 100 parts of a linear polypropylene glycol of approximate molecular weight 2000 for 1 minute. A solution of 1 part of a methyl-phenyl-polysiloxane containing approximately three methyl groups to one phenyl group, and having a viscosity of 120 centistokes at 25° C., in 40 parts of an 80:20 mixture of tolylene 2:4- and tolylene 2:6-diisocyanates, is added with vigorous stirring, and the mixture poured into a mould when foaming starts. A low density, flexible foam whose surface was "tack-free" in approximately 10 to 15 minutes is obtained. The structure was very even, and the product contained very few closed cells.

*Example 9*

2.1 parts of p-xylylene-di-pyridinium dichloride are dissolved in 4.7 parts of a solution prepared from 50 parts of the reaction product of 1 mole of nonyl phenol with 9 moles of ethylene oxide, 34 parts of the sodium salt of sulphated methyl oleate and 151 parts of water. 0.5 part of sodium hydroxide is added to the solution obtained above, and the resulting mixture is stirred with 100 parts of a linear polypropylene glycol of approximate molecular weight 2000, for 1 minute. A solution of 1 part of methyl-phenyl-polysiloxane containing approximately three methyl groups to one phenyl group, and having a viscosity of 120 centistokes at 25° C., in 40 parts of an 80:20 mixture of tolylene 2:4- and tolylene 2:6-diisocyanates is added, and the mixture stirred vigorously until foaming commences when it is poured into a mould. A low density flexible foam is obtained. The product was crushed after 30 minutes, and then cured for 30 minutes at 90° C.

*Example 10*

A solution of 1.2 parts of benzyl-trimethylammonium hydroxide, 1 part of the reaction product of 1 mole of nonylphenol with 9 moles of ethylene oxide and 1 part of the sodium salt of sulphated methyl oleate in 3 parts of water, is mixed vigorously with 100 parts of a linear polypropylene glycol of approximate molecular weight 2000 for 2½ minutes. After standing 30 seconds a solution of 1 part of a methyl-phenyl-polysiloxane containing approximately three methyl groups to one phenyl group and having a viscosity of 120 centistokes at 25° C. in 42.5 parts of an 80:20 mixture of tolylene 2:4- and tolylene 2:6-diisocyanates, is added with vigorous stirring. The mixture is poured into a mould whilst foaming. A flexible foam is rapidly obtained.

What we claim is:

1. An improved process for the manufacture of foamed polyurethane materials comprising substantially simultaneously interacting an
   organic polyisocyanate,
   a hydroxyl-containing polyether having predominantly secondary hydroxyl end groups,
   water and,
   as a catalyst, a basic compound selected from the group consisting of
      hydroxides of a member of the group consisting of alkali metals, alkaline earth metals and fully substituted quaternary ammonium radicals carrying substituents selected from the group consisting of alkyl, cycloalkyl and aralkyl groups, and
      salts of acids having an acid strength less than that of hydrochloric acid of a member of the group consisting of alkali metals, alkaline earth metals and fully substituted quaternary ammonium radicals carrying substituents selected from the group consisting of alkyl, cycloalkyl and aralkyl groups.

2. A process for the manufacture of foamed polyurethane materials as set forth in claim 1 wherein said basic compound is sodium hydroxide.

3. A process for the manufacture of foamed polyurethane materials as set forth in claim 1 wherein said basic compound is potassium hydroxide.

4. A process for the manufacture of foamed polyurethane materials as set forth in claim 1 wherein said basic compound is a sodium salt of an acid having an acid strength less than that of hydrochloric acid.

5. A process for the manufacture of foamed polyurethane materials as set forth in claim 1 wherein said basic compound is a potassium salt of an acid having an acid strength less than that of hydrochloric acid.

6. A process for the manufacture of foamed polyurethane materials as set forth in claim 1 wherein said basic compound is sodium phenate.

7. A process for the manufacture of foamed polyurethane materials as set forth in claim 1 in which the basic compound is employed in a portion of between about 0.01 and 5% by weight of said hydroxyl-containing polymer.

8. A process for the manufacture of polyurethane materials as set forth in claim 1 in which the basic compound is employed in a portion of between about 0.25 and 2.5% by weight of the hydroxyl-containing polymer.

9. A process for the manufacture of foamed polyurethane materials as set forth in claim 1 in which the interaction is carried out in the presence of a silicone oil surfactant.

References Cited in the file of this patent

UNITED STATES PATENTS

| | | |
|---|---|---|
| 2,888,408 | Rogers et al. | May 26, 1959 |
| 2,894,919 | Simon et al. | July 14, 1959 |
| 2,901,445 | Harris | Aug. 25, 1959 |
| 2,902,456 | Gee et al. | Sept. 1, 1959 |
| 2,938,005 | Bick et al. | May 24, 1960 |
| 2,950,262 | Bush et al. | Aug. 23, 1960 |
| 2,955,058 | Foster | Oct. 4, 1960 |
| 2,977,330 | Brower | Mar. 28, 1961 |
| 2,990,379 | Young et al. | June 27, 1961 |
| 3,036,020 | Britain | May 22, 1962 |

FOREIGN PATENTS

| | | |
|---|---|---|
| 794,403 | Great Britain | May 7, 1958 |